H. HESS.
BALL BEARING.
APPLICATION FILED OCT. 19, 1907.
975,616. Patented Nov. 15, 1910.
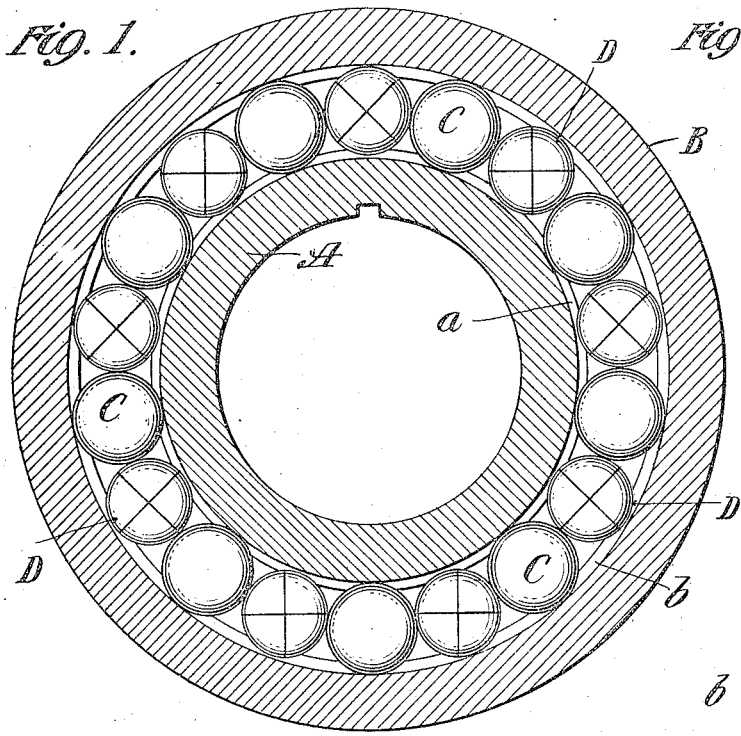
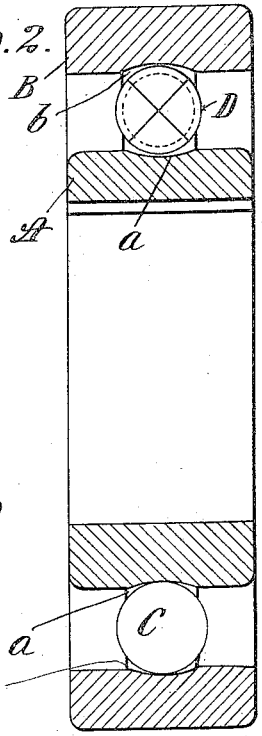
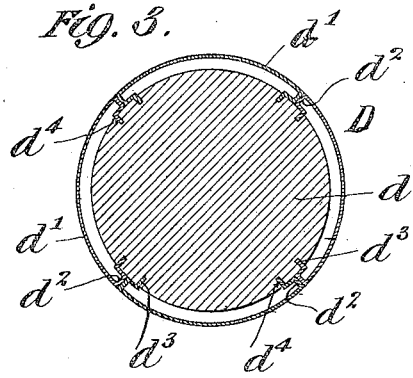
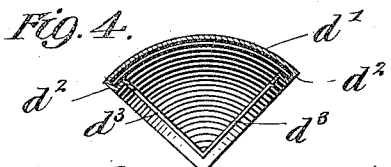
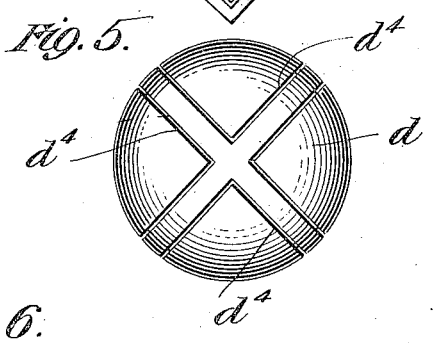
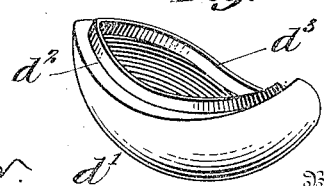
Witnesses:
Inventor:
HENRY HESS
By his Attorney

UNITED STATES PATENT OFFICE.

HENRY HESS, OF WAWA, PENNSYLVANIA.

BALL-BEARING.

975,616.    Specification of Letters Patent.    Patented Nov. 15, 1910.

Application filed October 19, 1907. Serial No. 398,181.

*To all whom it may concern:*

Be it known that I, HENRY HESS, a citizen of the United States, residing at Wawa, in the county of Delaware and State of Pennsylvania, have invented certain new and useful Improvements in Ball-Bearings, of which the following is a specification, reference being had therein to the accompanying drawing.

My invention relates to ball bearings, and more particularly to that class thereof wherein the balls are separated one from another by interposed elastic separators,—this class of bearing being ordinarily termed the "silent" type. As frequently employed, such separators are cylindrical in form and bear at their ends against the balls, and it sometimes happens, due to the presence of grit, acid, or other obstruction, or because of some accidental occurrence in the operation, that these cylindrical separators are tilted from their normal position to such an extent that their ends are drawn under the balls. The results of this abnormal condition are not only serious to the separators themselves but also occasionally result in the destruction of the bearing. To obviate this objection I propose to employ a separator of spherical form which will always present the same configuration to the other parts of the bearing even though its position be constantly changed therein. I also propose to make the separator elastic, not only to insure its proper relation to the balls, but also to permit its partial deformation and compression, so that it may be introduced into the annular race without the use of filling openings and the like, as sometimes employed in the art. In order to secure these advantages and at the same time obtain a separator of the requisite durability and with sufficient elasticity to give it the desired functions, I have herein shown and described a spherical separator consisting of a rigid interior core and an elastic cover connected thereto.

Referring to the drawing: Figure 1 is a transverse section of a bearing with my invention applied thereto; Fig. 2 is a transverse section of the same, the section being taken at right angles to that of Fig. 1; Fig. 3 is a sectional view of the separator; Fig. 4 is a sectional view of one of its outer parts or elements; Fig. 5 is a perspective view of the inner core; and Fig. 6 is a perspective view of one of the outer parts or elements.

The bearing consists of the inner ring A, the outer ring B, wherein are formed respectively the grooves $a$ and $b$ that constitute the annular race, and of the balls C, C between which are interposed the separators D, D.

Each separator D is of spherical form and comprises a rigid or solid core $d$ and an external elastic covering $d^1$. For purposes of convenience, this outer and elastic skin may be made in segmental sections, four such sections being illustrated, in order to facilitate its manufacture, as well as to permit its easy attachment to the core. Each section is provided with edges or flanges $d^3$, $d^3$, which enter and engage corresponding slots or grooves $d^4$, $d^4$, in the core $d$, whereby the parts are connected; and each section is further formed with projecting sides or crimps $d^2$, $d^2$, so that when the various elements are pressed home against the core, the crimps of one section will abut against the crimps of the adjacent section, and thus secure their correct position as well as substantial and continuous sphericity for the entire outer surface.

For the purposes mentioned I prefer to make the outer sections of thin sheet-metal, but I do not desire to limit myself in this regard, nor as to the other specific features of construction and arrangement, which have been shown merely by way of example. It is obvious that the details may be varied in many ways without departing from the spirit of my invention.

What I claim and desire to secure by Letters-Patent of the United States is as follows:

1. In a ball bearing, the combination of the casing members formed with tracks or ways and substantially inelastic and non-deformable load-bearing balls located therein, together with elastic and deformable spherical separators interposed between the load-bearing balls, the said separators being capable of introduction into and removal from the tracks or ways by elastic deformation.

2. A separator for ball bearings, spherical in form, and comprising a core, and an external elastic and deformable casing connected thereto.

3. A separator for ball bearings, spherical in form and comprising a core and an elastic casing formed in sections and connected thereto.

In testimony whereof I have affixed my signature in presence of two witnesses.

HENRY HESS.

Witnesses:
C. D. McCalla,
J. J. Quinn.